United States Patent
Gammenthaler, Jr.

(10) Patent No.: US 6,934,302 B2
(45) Date of Patent: Aug. 23, 2005

(54) CONTEXT SWITCHING SYSTEM AND METHOD FOR IMPLEMENTING A HIGH SPEED LINK (HSL) IN A NETWORK ELEMENT

(75) Inventor: Robert S. Gammenthaler, Jr., Frisco, TX (US)

(73) Assignee: Alcatel, Paris (FR)

(*) Notice: Subject to any disclaimer, the term of this patent is extended or adjusted under 35 U.S.C. 154(b) by 980 days.

(21) Appl. No.: 09/853,388

(22) Filed: May 11, 2001

(65) Prior Publication Data

US 2002/0167910 A1 Nov. 14, 2002

(51) Int. Cl.[7] .................................. H04L 12/56
(52) U.S. Cl. ........................................ 370/469
(58) Field of Search .......................... 370/236, 236.1, 370/236.2, 395.1, 395.3, 410, 469, 496, 522

(56) References Cited

U.S. PATENT DOCUMENTS

| | | | |
|---|---|---|---|
| 5,546,453 A | | 8/1996 | Hebert |
| 6,101,599 A | * | 8/2000 | Wright et al. ............... 712/228 |
| 2002/0010793 A1 | * | 1/2002 | Noll et al. .................. 370/229 |
| 2002/0161919 A1 | * | 10/2002 | Boucher et al. ............ 709/238 |
| 2004/0081202 A1 | * | 4/2004 | Minami et al. ............. 370/469 |

FOREIGN PATENT DOCUMENTS

EP          1067737 A    1/2001

* cited by examiner

Primary Examiner—Chi Pham
Assistant Examiner—Anh-Vu H Ly
(74) Attorney, Agent, or Firm—Danamraj & Youst, P.C.; V. Lawrence Sewell

(57) ABSTRACT

A system and method for personalizing a generic state machine (GSM) logic structure in order to effectuate individual protocol layer functionality of a high speed link protocol stack at a network node (i.e., an application node) having a plurality of connections. An input event structure including at least a service access point (SAP) and a connection identifier (CID) associated with a select service provider layer is provided to a context switch and control block that is operable to retrieve latest state-specific context information based on the SAP and CID. The GSM logic structure is personalized based on the context information to effectuate appropriate service provider layer functionality. The input event is processed by the personalized GSM logic structure to generate next-state information and an output event vector including SAP/CID data for specifying appropriate destinations (i.e., one or more service user layers).

33 Claims, 13 Drawing Sheets

CONTEXT SWITCHING SYSTEM AND METHOD FOR IMPLEMENTING A HIGH SPEED LINK (HSL) IN A NETWORK ELEMENT

CROSS-REFERENCE TO RELATED APPLICATION(S)

This application discloses subject matter related to the subject matter disclosed in the following commonly owned co-pending patent applications: (i) "State Machine Architecture Partitionable Into Control And Data Planes," filed May 11, 2001, Ser. No.: 09/853,387, in the name(s) of: Robert S. Gammenthaler, Jr.; (ii) "Method And Apparatus For An MLSC State Machine," filed Mar. 31, 2000, Ser. No. 09/541,411, in the name(s) of Michael Vincze and Robert S. Gammenthaler, Jr.; and (iii) "Clock Distribution Scheme In A Signaling Server," filed Mar. 31, 2000, Ser. No. 09/541,002, in the name(s) of Val Teodorescu, which are hereby incorporated by reference herein for all purposes.

BACKGROUND OF THE INVENTION

1. Technical Field of the Invention

The present invention generally relates to signaling protocols in telecommunications networks. More particularly, and not by way of any limitation, the present invention is directed to a system and method for implementing a high speed link (HSL) at a network element capable of supporting multiple connections using a generic state machine (GSM) architecture.

2. Description of Related Art

Out-of-band signaling establishes a separate channel for the exchange of signaling information between call component nodes in order to set up, maintain and service a call in a telephony network. Such channels, called signaling links, are used to carry all the necessary signaling messages between the nodes. Thus, for example, when a call is placed, the dialed digits, trunk selected, and other pertinent information are sent between the network elements using their signaling links, rather than the trunks which will ultimately carry the bearer traffic, i.e., conversation.

Out-of-band signaling has several advantages that make it more desirable than traditional in-band signaling. First, it allows for the transport of more data at higher speeds than multi-frequency (MF) outpulsing used in the telephony networks of yore. Also, because of separate trunks and links, signaling can be done at any time in the entire duration of the call, not just at the beginning. Furthermore, out-of-band signaling enables signaling to network elements to which there is no direct trunk connection.

Signaling System No. 7 (SS7) provides a packet-based signaling architecture that has become the out-of-band signaling scheme of choice between telephony networks and between network elements worldwide. Three essential components are defined in a signaling network based on SS7 architecture. Signal Switching Points (SSPs) are basically telephone switches equipped with SS7-capable software that terminate signaling links. SSPs generally originate, terminate, or switch calls. Signal Transfer Points (STPs) are the packet switches of the SS7 network. In addition to certain specialized functions, they receive and route incoming signaling messages towards their proper destination. Finally, Service Control Points (SCPs) are databases that provide information necessary for advanced call-processing and Service Logic execution.

As is well known, SS7 signaling architecture, effectuated as a multi-layered protocol that is standardized under such organizations as the American National Standards Institute (ANSI) and the International Telecommunications Union (ITU), is operable as the common "glue" that binds the ubiquitous autonomous networks together so as to provide a "one network" feel that telephone subscribers have come to expect. Furthermore, SS7 signaling has made it possible to provision a host of advanced services (or, Value-added Services) based on Intelligent Network (IN)/Advanced Intelligent Network (AIN) architectures in both wireless and wireline telecommunications networks.

The exponential increase in the number of local telephone lines, mobile subscribers, pagers, fax machines, and other data devices, e.g., computers, Information Appliances, portable and hand-held devices, etc., coupled with deregulation that is occurring worldwide today is driving demand for high capacity STPs which must be easy to maintain, provide full SS7 functionality with so-called "five nines" operational availability (i.e., 99.999% uptime), and additionally provide the capability to support future functionality or features as the need arises. Further, as the subscriber demand for more service options proliferates, an evolution is taking place in the telecommunications industry to integrate IN/AIN-capable SCP functionality within STP nodes.

While it is generally expected that a single platform that supports large-database, high-transaction IN services as well as high-capacity packet switching (hereinafter referred to as a signaling server platform) will reduce equipment costs, reduce network facility costs and other associated costs while increasing economic efficiency, those skilled in the art should readily recognize that several challenges must be overcome before the requisite functionalities can be realized in a suitable network element that satisfies the stringent performance criteria required of telecommunications equipment. First, such a platform must be capable of maintaining a large number of signaling links in order to support the high degree of connectivity required of it. Also, it may be necessary that the signaling links be capable of supporting high transmission rates. As a consequence, the network element must be provided with the capability to efficiently manage the protocol stacks required to implement such high speed signaling links.

Conventional solutions addressing these concerns are beset with numerous shortcomings. Typically, when multiple signaling links based on SS7 architecture are implemented at a node, a plurality of well known SS7 protocol instances are provided, wherein each instance is operable to support a corresponding signaling connection. Further, where hardware implementations are utilized in order to gain performance, the functionality of each layer of the multi-layer protocol instance is effectuated by employing a corresponding state machine in a suitable device realization. It should be appreciated by those skilled in the art that when a large number of signaling link connections are to be maintained, implementing the protocol layer functionality in individual state machines is an unwieldy task because the functionality of each protocol instance needs to be replicated across the entire range of the connections, which thereby gives rise to a large combinatorial matrix of the connections and protocol layers. Further, although the hardware-based state machine implementations are generally superior to software-based implementations in performance, managing the large combinatorial matrices involving the plural link connections and protocol layers negatively impacts link performance in the network node.

In addition, where multiple links are supported in the existing solutions, the signaling protocol stack implementations are confined to managing conventional SS7 protocol instances, with their usual limitation on transmission rates (e.g., 56 kilobits per second) at the physical layer level. That is, they are not adapted to other, higher-transmission-rate capable networking technologies such as, e.g., Asynchronous Transfer Mode (ATM) technology.

SUMMARY OF THE INVENTION

Accordingly, the present invention advantageously provides a context switching system and method wherein a generic state machine (GSM) logic structure is personalized for effectuating individual protocol layer functionality of a high speed link (HSL) protocol stack at a network node (i.e., an application node) having a plurality of connections. An input event structure including at least a service access point (SAP) and a connection identifier (CID), which input event is associated with a select service provider layer, is provided to a context switch and control block that is operable to retrieve latest state-specific context information from a context memory based on the SAP and CID. The GSM logic structure is personalized based on the context information to effectuate appropriate service provider layer functionality. The input event is processed by the personalized GSM logic structure to generate next-state information and an output event vector having SAP/CID data for specifying appropriate destinations points (e.g., one or more service user layers) therefor. Furthermore, the next-state information is stored in the context memory based on the SAP/CID data that is specified in the input event vector.

In a presently preferred exemplary embodiment of the present invention, the GSM logic structure is operable to be personalized to include a state logic package for the following control functionalities of the HSL protocol layers: Message Transfer Part-Level 3 (MTP-3) Queue Control; Service Specific Coordination Function (SSCF) Control; Service Specific Connection Oriented Protocol (SSCOP) Control; Asynchronous Transfer Mode (ATM) Adaptation Layer (AAL) (preferably such as AAL-Level 5) Control; ATM Queue Control; ATM Control, Timer Control; and Traffic Metering and Measurement (TMM) Control.

Further, appropriate state logic packages are personalized into the GSM logic structure for effectuating burst data transfers of signal units (SUs) between the application node's host processor memory and local memory. The following data transfer state logic packages are exemplary: SSCF Layer Data Processing; SSCOP Layer Data Processing; and AAL5 Layer Data Processing.

In another aspect, the present invention is directed to a system preferably provided as an application node card for implementing the HSL protocol stack having a plurality of protocol layers. A link data processor operably coupled to a card connector is responsible for coordinating cell assembly and cell disassembly operations with respect to ingress and egress traffic flow. A link control processor is coupled to the link data processor via an inter-device interface (IDI) for maintaining link states for control functionalities of the HSL protocol stack layers by utilizing a personalizable generic state process architecture. A data transfer controller is coupled to the link control processor via another IDI for controlling burst transfers of SUs between the host memory and a local cell memory associated with the link data processor. A context memory block is disposed between the link control processor and the data transfer controller for storing state-specific context information indexed on SAP and CID data associated with at least a portion of the HSL stack layers across the active connections maintained by the application node in the network. The context information is retrieved by a context switch and control block provided with the link control processor and the data transfer controller, based on the SAP/CID data provided in an input event, for personalizing the generic state process architecture operable with the link control processor and the data transfer controller.

In an exemplary implementation, the link data processor, link control processor and the data transfer controller, and/or the respective context switch/control blocks and GSM logic structures (where applicable) may be provided as a device selected from the group consisting of a field programmable gate array (FPGA), a programmable logic device (PLD), an application specific integrated circuit (ASIC), an embedded processor, and a general purpose processor. In another exemplary implementation, the link data processor, link control processor and the data transfer controller blocks may be integrated in any combination. For instance, the link data processor and link control processor blocks may be integrated into a single block.

In yet another aspect, the present invention is directed to method of effectuating a layer service in a protocol stack operable to implement a high speed communication link at a network node. Upon receiving, at a context switching system, an input event for a particular layer service from a service user layer, state-specific context information is retrieved from a context memory based on SAP/CID data determined in the input event. The input event may include additional relevant parameters associated with the current state, such as message sequence numbers. The input event is processed by a GSM logic structure personalized by the state-specific context information in order to generate next-state information and an output event vector including output SAP/CID information for at least one service user destination. Accordingly, the next-state information is operable to be provided to an adjacent layer or a peer layer involved the layer service. In addition, the next-state information is capable of being stored in the context memory based on the SAP/CID information that is provided in the input vector.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1:
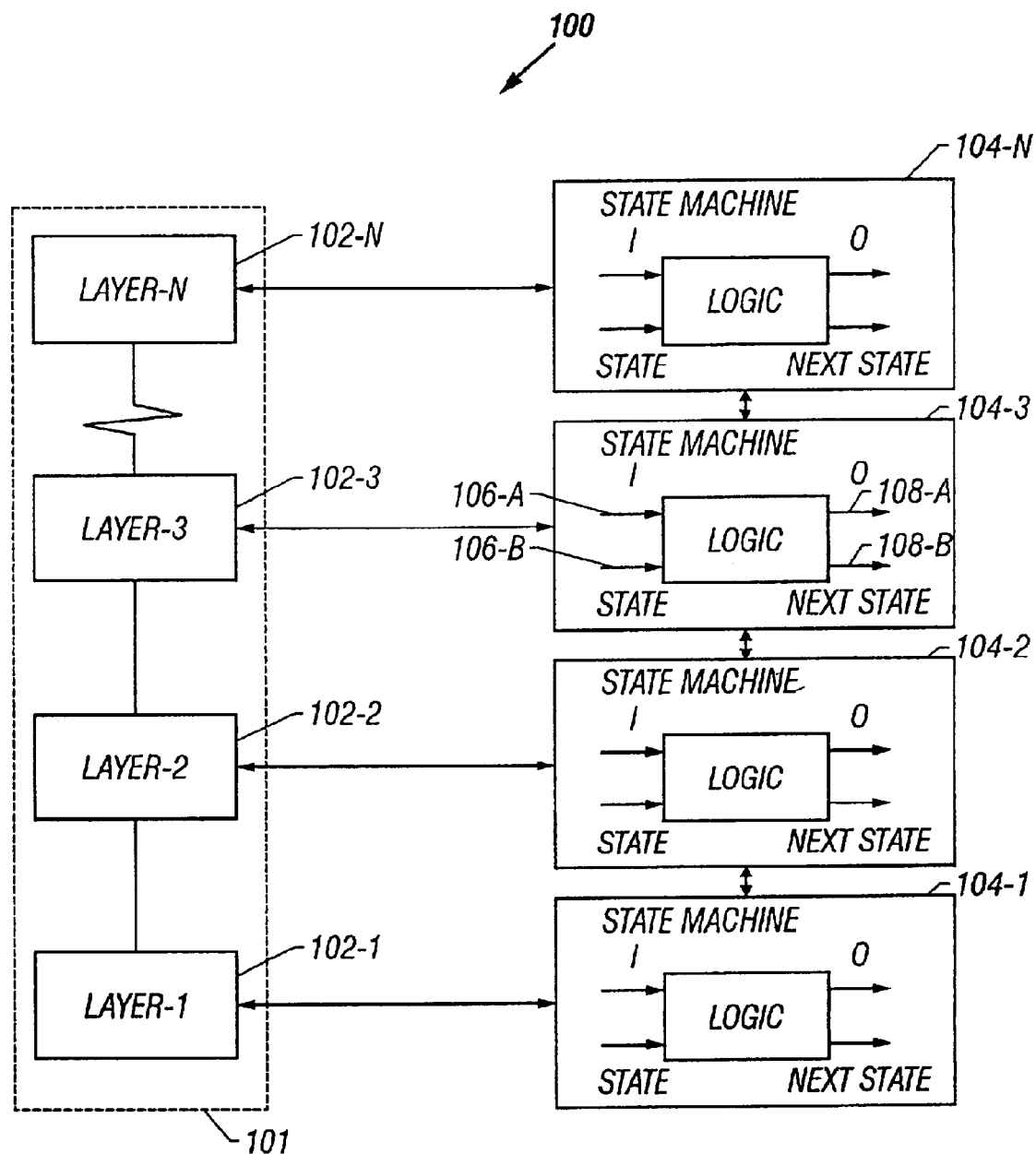
FIG. 1 (Prior Art) depicts a conventional protocol stack implementation at an application node disposed in a telecommunications network.

In the drawings, like or similar elements are designated with identical reference numerals throughout the several views thereof, and the various elements depicted are not necessarily drawn to scale. Referring now to FIG. 1, depicted therein is a schematic diagram of a conventional implementation of a communication protocol suite 101 at an application node or network element 100 disposed in a telecommunications network (not shown). It should be readily appreciated by those skilled in the art that the protocol suite 101 comprising a plurality of protocol layers (e.g., Layer-1 through Layer-N, with reference numerals 102-1 through 102-N, respectively) may be provided as a protocol stack conforming to the Open Systems Interconnection (OSI) reference framework. Accordingly, Layer-1 102-1 represents the physical (PHY) layer which defines the electrical, mechanical, procedural, and functional specifications for activating, maintaining, and deactivating a communication link or connection that is supported by the application node 100. Similarly, the functionality of the OSI model data link layer can be provided by Layer-2 102-2. Consequently, Layer-2 102-2 is operable to support reliable data transport across a physical network link and its functionality generally includes physical addressing, error notification and frame sequencing, and flow control. Layer-3 through Layer-N are similarly operable to provide the functionality of additional OSI model layers such as network layer, transport layer, session layer, presentation layer, and application layer.

As is well known, one or more signaling communication links at the application node 100 may be effectuated by providing multiple protocol instances wherein appropriate layer services are implemented for achieving protocol-specific functionalities. Typically, one protocol layer is capable of communicating with three other protocol layers: the layer directly above it, the layer directly below it, and its peer layer across the link in the network in which the application node is disposed. Furthermore, the services provided by adjacent layers are generally necessary at least in part for a given protocol layer in order to communicate with its peer layer at a different node. Accordingly, three elements may be defined with respect to a layer service transaction: the service user, the service provider, and the service access point or SAP. In this context, the service user is the protocol layer that requests services from an adjacent layer. The service provider is the protocol layer that provides services to one or more service user layers. The SAP is a conceptual location at which one protocol layer can request the services of another protocol layer.

In the conventional implementation of the protocol suite 101, the functionality of each protocol layer is effectuated by a particular state machine realized in appropriate hardware such as, e.g., field programmable gate arrays (FPGAs), programmable logic devices (PLDs), and the like. Each individual state machine is operable to inter-communicate with other state machines pursuant to effectuating a specific layer service with respect to the signaling interface being implemented. In FIG. 1, a plurality of state machines (reference numerals 104-1 through 104-N) are accordingly illustrated, wherein each protocol layer is associated with a select state machine. Each state machine is provided with a logic block operable to realize the corresponding layer's functionality. When a particular layer is accessed by a service user layer, an input event and current state information (or, previous state information, depending on the counting convention) relating to the layer are provided as input to the logic block. Appropriate processing thereat yields an output event and next-state information which may be provided to the service user layer involved in the layer service. In particular reference to state machine 104-3, logic block 110 is operable to process input event 106A and state information 106B to provide output event 108A and next-state information 108B.

Figure 2:
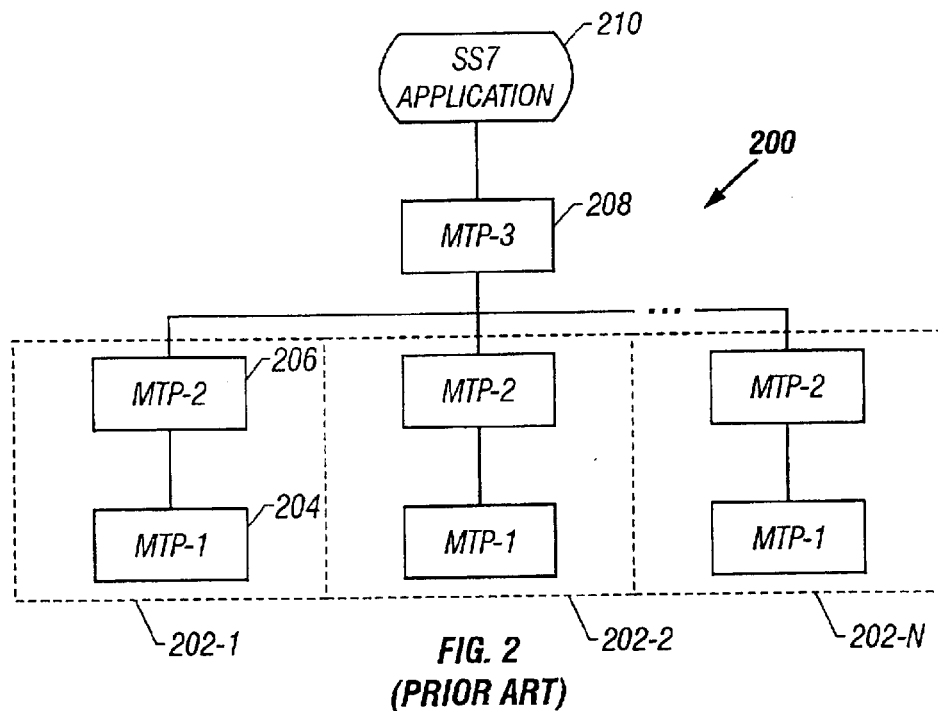
FIG. 2 (Prior Art) depicts an exemplary conventional implementation of an SS7 protocol stack at an application node having multiple connections.

Referring now to FIG. 2, depicted therein is an exemplary implementation of a conventional SS7 protocol stack 200 at an application node supporting a plurality of links (i.e., a link set). Each link connection is supported by a particular signaling protocol stack instance having appropriate protocol layers. In FIG. 2, reference numerals 202-1 through 202-N accordingly exemplify the multiple instances of the lower protocol stack portion operable to support the plurality of links. As is well known, each protocol stack instance comprises a Message Transfer Part-Level 1 (MTP-1) layer (e.g., reference numeral 204) and an MTP-2 layer (e.g., reference numeral 206) for providing the physical layer and data link layer functionality of the OSI model. An MTP-3 layer 208 responsible for the network layer functionality is provided for supervising the multiple instances of the lower protocol stack portion. Appropriate SS7 applications 210 such as the various user parts (e.g., Telephony User Part or TUP, Data User Part or DUP, et cetera), Transaction Capabilities Application Part (TCAP), or Signaling Connection Control Part (SCCP), and the like are interfaced to the MTP-3 layer 208 for providing application-level signaling functionality.

As has been pointed out in the Background section of the present patent application, supporting multiple connections at an application node by implementing a number of protocol stack instances wherein each layer is realized in an individual state machine is not only extremely cumbersome but the link performance is degraded as well.

Figure 3:
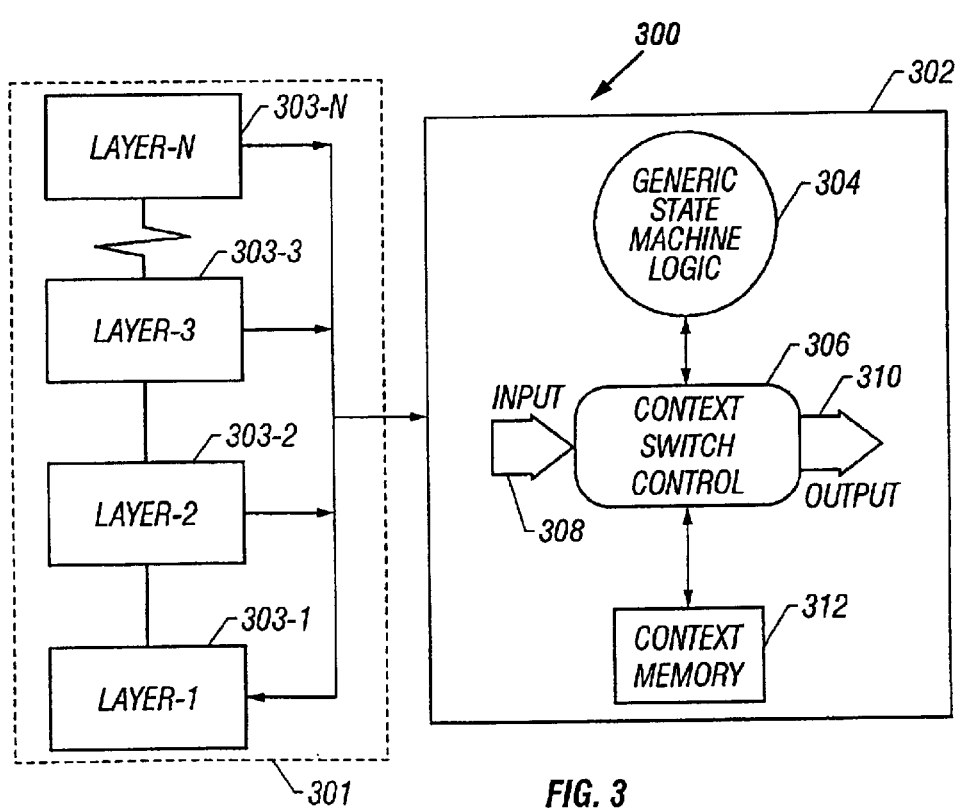
FIG. 3 depicts a functional schematic diagram of an exemplary implementation of a communication protocol stack at an application node in accordance with the teachings of the present invention, wherein a context switch and control system is provided for personalizing a generic state machine (GSM) architecture to effectuate individual protocol layer functionality.

FIG. 3 depicts a functional schematic diagram of an exemplary implementation of a communication protocol stack 301 at an application node 300 in accordance with the teachings of the present invention, wherein a generic state machine (GSM) architecture 302 is utilized for effectuating individual protocol layer functionality. The exemplary communication protocol stack 301 is comprised of a plurality of layers 303-1 through 303-N that are preferably substantially conformable to the OSI reference framework set forth hereinabove. The GSM architecture 302 comprises a context switch and control system 306 operable to receive an input event structure 308, a context memory 312, and a GSM logic structure 304 that can be personalized by the context switch and control system 306. The input event structure 308 is comprised of information regarding the SAP and a connection identifier (CID) associated with the service provider layer involved in a specific protocol layer service. Preferably, the input event structure 308 may include additional relevant parameters associated with the current input information (e.g., message sequence numbers).

The context switch control system 306 is operable to retrieve latest state-specific context information (which can be current state or previous state, depending on the counting convention) from the context memory 312 based on the SAP/CID information of the input event structure 308. By providing the relevant context of the current SAP/CID, the context switch/control system 306 personalizes the GSM logic program structure 304 to be operable as one or more specific state logic packages (SLPs) associated with the service provider protocol layer. The SLP is operable thereafter to process at least a portion of the input event structure 308 based on the state information retrieved from the context memory 312. An output event structure 310 comprising an output vector, which includes SAP/CID information for identifying appropriate destinations (i.e., service user layer(s) involved in the protocol layer service and other entities) and next-state information is generated pursuant to the processing by the personalized SLP. The next-state information is operable to be stored back in the context memory 312 based on the SAP/CID information in the input vector.

Figure 4:
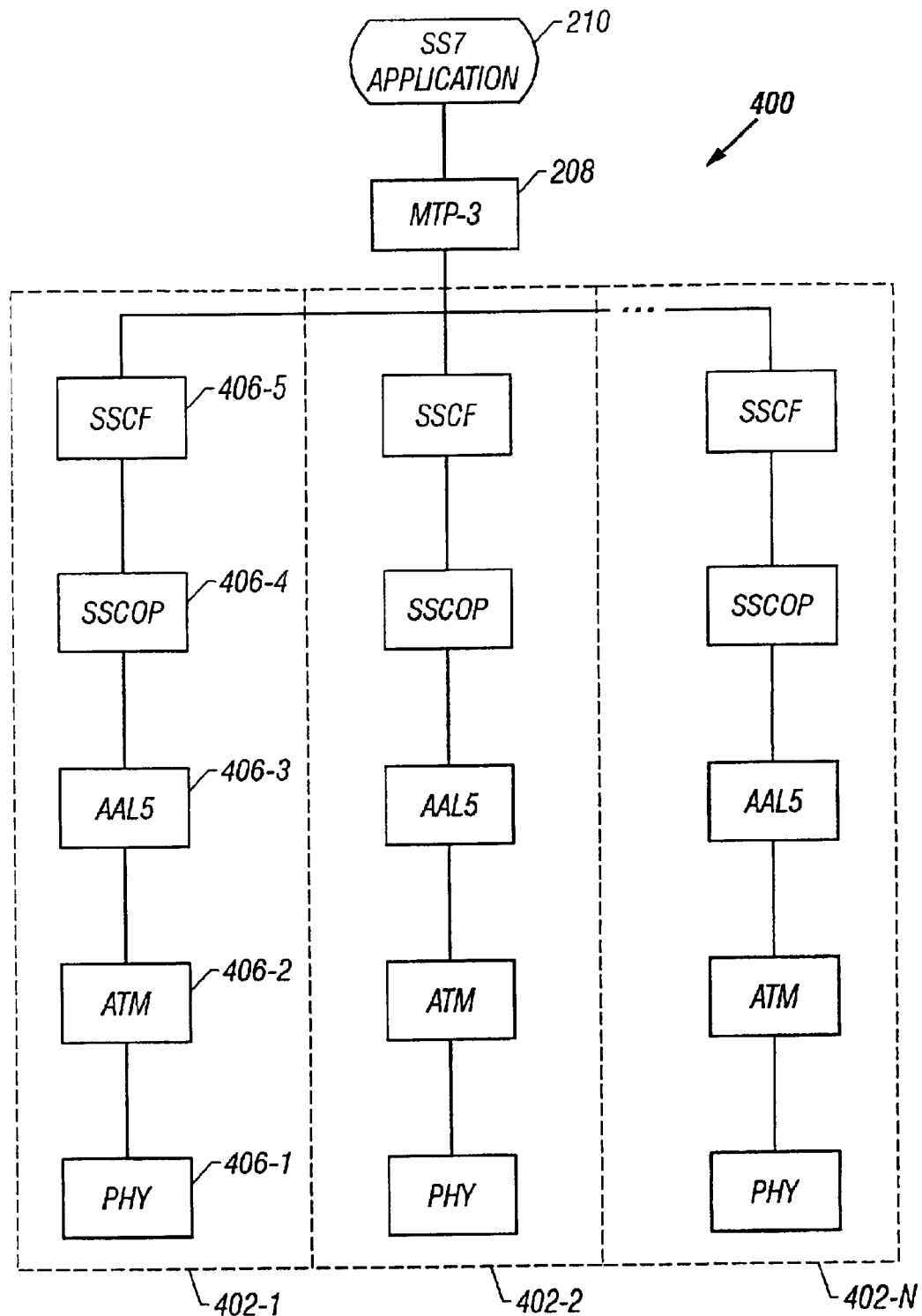
FIG. 4 depicts a presently preferred exemplary communication protocol stack for implementing a high speed link (HSL) at an application node in accordance with the teachings of the present invention.

Referring now to FIG. 4, depicted therein is a presently preferred exemplary communication protocol stack 400 for implementing an ATM-based high speed link (HSL) with multiple link connections at an application node in accordance with the teachings of the present invention. Reference numerals 402-1 through 402-N refer to a plurality of protocol stack instances corresponding to the plural connections maintained by the application node. Preferably, the application node comprises a network element such as a signaling server disclosed in the following co-pending U.S. patent applications which have been cross-referenced hereinabove: (i) "Method And Apparatus For An MLSC State Machine," filed Mar. 31, 2000, Ser. No. 09/541,411, in the name(s) of Michael Vincze and Robert S. Gammenthaler, Jr.; and (ii) "Clock Distribution Scheme In A Signaling Server," filed Mar. 31, 2000, Ser. No. 09/541,002, in the name(s) of Val Teodorescu.

Each HSL protocol stack instance, e.g., protocol stack instance 402-1, comprises a PHY Layer 406-1 responsible for the physical layer functionality, an ATM Layer 406-2 that parses SS7 signaling information into ATM cell traffic, a suitable ATM Adaptation Layer (AAL) such as AAL5 406-3, a Service Specific Connection Oriented Protocol (SSCOP) Layer 406-4 which is standardized (ANSI T1.637-1994) for setting up and tearing down switched virtual circuits associated with the signaling link, and a Service Specific Coordination Function (SSCF) Layer 406-5. As is well known, the SSCF layer 406-5 defined by the ANSI T1.645-1995 Standard is operable to provide an interface to the MTP-3 layer 208 which emulates the functionality of the MTP-2 layer of a conventional SS7 stack. Appropriate SS7 applications 210 are operable to interface with the MTP-3 layer 208 for effectuating suitable signaling functions.

Figure 5:
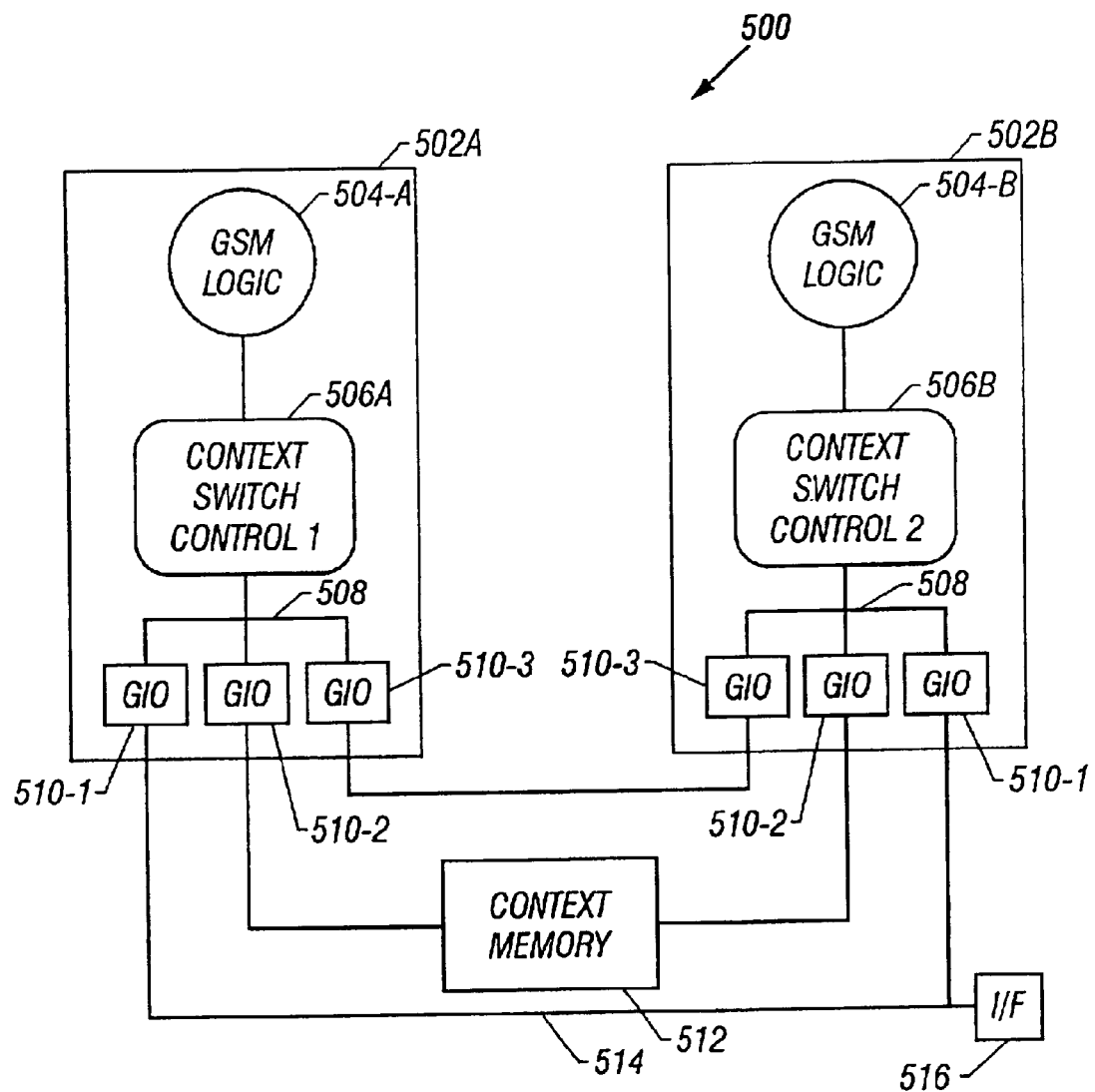
FIG. 5 depicts two tandem context switch and control systems for segregating protocol stack functionality.

Those skilled in the art should appreciate that the HSL implementation provided in the presently preferred exemplary embodiment of the present invention can be very processor-intensive in some applications, especially where a number of links are to be maintained, although the GSM architecture of the present invention alleviates the management problems relating to the numerous layer/link combinations that result from effectuating multiple protocol instances across a plurality of CIDs. Accordingly, the GSM architecture of the present invention is preferably provided to be operable in a scalable and parallel fashion wherein the overall HSL protocol stack functionality of an application node can be distributed over multiple context switch and control systems provided for personalizing a plurality of GSMs into appropriate SLPs. FIG. 5 depicts an exemplary GSM arrangement 500 comprised of two tandem GSM architectural blocks 502A and 502B, each effectuating a segmented portion of an HSL protocol stack. Each GSM architectural block includes a context switch and control system operable to personalize a GSM logic structure to effectuate a corresponding portion of the HSL protocol stack. Accordingly, the context switch and control system 506A is operable with the GSM logic structure 504A in the architectural block 502A. Similarly, the context switch and control system 506B is operable with the GSM logic structure 504B in the architectural block 502B.

The GSM architectural blocks 502A, 502B are preferably provided with an internal standard bus (ISB) 508 for interconnecting the context switch/control systems with a plurality of generic input/output (GIO) interfaces 501-1 through 510-3. The ISB system 508, described in additional detail hereinbelow, and the associated GIO interfaces provide an interconnect-independent interface between a GSM architectural block and the external bus systems necessary to communicate with such entities as context memory 512, host processor interface 516 via a local bus 514, e.g., a Peripheral Component Interconnect (PCI) bus, and the like. Further, the GIO blocks may also be utilized for establishing an interconnection path between the GSM architectural blocks 502A, 502B. While a common context memory 512 is exemplified for storing appropriate state-specific context data that is indexed based on the SAP/CID vectors, it should be realized that the context memory 512 may be partitioned as well, wherein each partition is operable to serve a particular GSM architecture block. Preferably, a fixed memory structure is used which facilitates computation of SAP offsets within a CID offset, relative to a SAP/CID base address.

Figure 6:
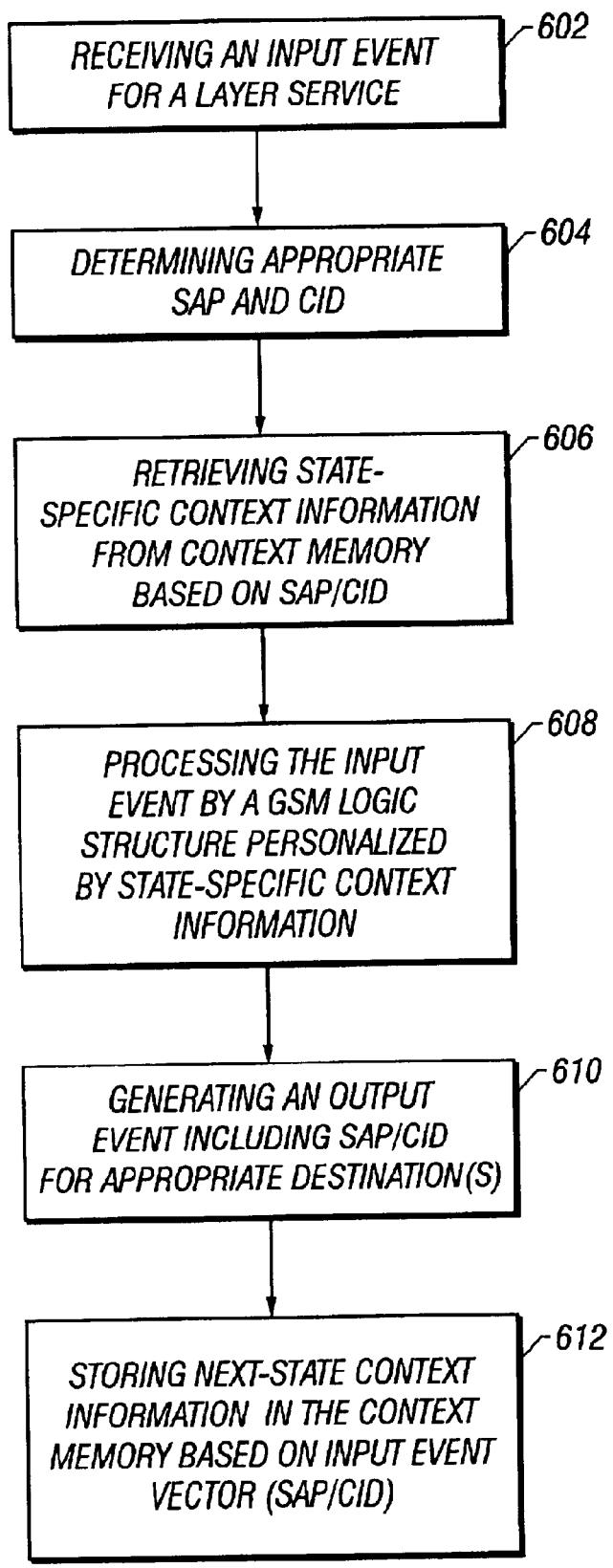
FIG. 6 is a flow chart of the steps involved in an exemplary method for providing a layer service in an HSL protocol stack in accordance with the teachings of the present invention.

Referring now to FIG. 6, depicted therein is a flow chart of the steps involved in a method for effectuating a layer service in a protocol stack operable to implement a high speed communication link (i.e., an HSL) at a network node in accordance with the teachings of the present invention. Upon receiving, pursuant to a protocol layer service, an input event relating to a service provider layer at a context switching system (step 602), SAP/CID information associated with the input event is determined (step 604) in order to retrieve appropriate state-specific context information from a context memory (step 606). Using the state-specific context information, a GSM logic structure is personalized by the context switching system as an SLP adapted to execute layer-specific service logic. The personalized GSM logic structure is thereafter operable to process at least a portion of the input event, using the context of the current SAP (step 608). An output event is generated by the GSM logic structure, which preferably includes a SAP/CID vector for identifying at least one service user destination (e.g., adjacent service user layers, etc.) (step 610). Appropriate next-state information associated with the output event is also generated by the GSM logic structure that is provided to the destinations identified in the SAP/CID vector. Furthermore, the next-state information is stored in the context memory based on a storage SAP/CID vector provided in the input event for subsequent use (step 612).

Figure 7:
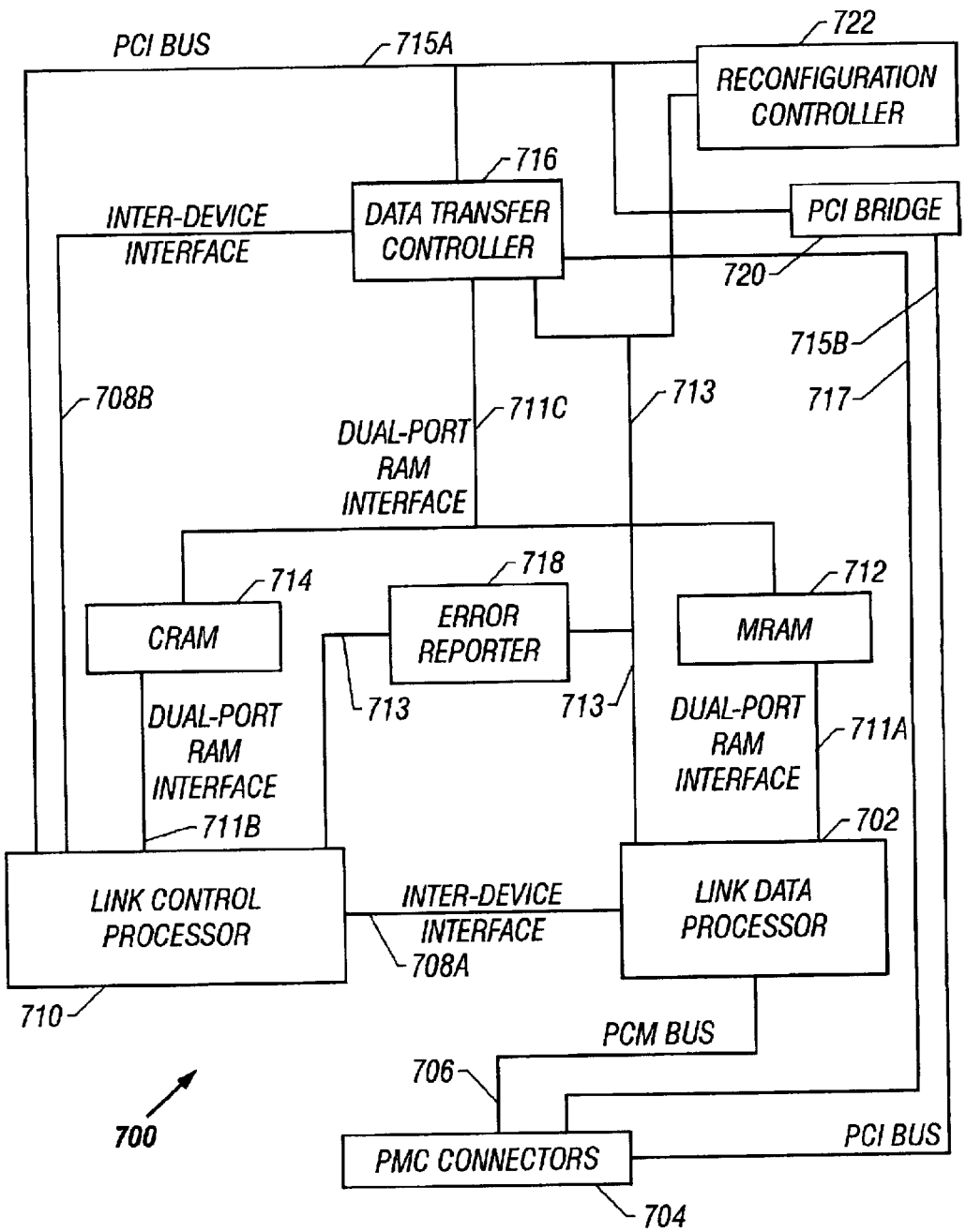
FIG. 7 depicts a functional block diagram of a presently preferred exemplary implementation of card circuitry for realizing the HSL stack of the present invention.

FIG. 7 depicts a high-level functional block diagram of a presently preferred exemplary implementation of card circuitry 700 for realizing the HSL protocol stack of the present invention. A link data processor 702 coupled to a plurality of PCI Mezzanine Card (PMC) connectors 704 via one or more buses 706 that are operable to carry Pulse Code Modulated (PCM) data, is primarily responsible for the ATM layer functionality. Cell synchronization is accordingly maintained within this block. Received cells are written to a message memory (MRAM) 712 via a dual-port memory interface 711A. Cells are generated at the link based on control information provided from a link control processor 710 via an inter-device interface (IDI) 708A.

The link control processor 710 is operable to maintain link states for the control portion of the relevant HSL protocol layers. As will be described in greater detail hereinbelow, the link control processor 710 uses the GSM processing architecture of the present invention for effectuating appropriate link state functionality. In addition to the IDI 708A, the link control processor 710 is provided with another IDI 708B for communication with a data transfer controller 716.

A dual-port context memory (CRAM) 714 is operably coupled to the link control processor 710 via interface 711B. The data transfer controller 716 is operably coupled to both MRAM 712 and CRAM 714 via a dual-port RAM interface 711C and is responsible for burst transfers of signal units (SUs) between the host processor RAM and local MRAM cell memory. Similar to GSM-based implementation of the link control processor 710, the data transfer controller 716 is also preferably provided with the GSM processing architecture of the present invention for effectuating appropriate data burst operations. Layer overhead may be inserted or extracted from the data stream during the burst and a control path 717 is provided between the data transfer controller 716 and the PMC connectors 704.

The link control processor 710 and data transfer controller 716 are coupled to a reconfiguration controller 722 through a local bus such as, e.g., PCI bus 715A. A PCI bridge 720 disposed on the PCI bus segment 715A bridges to another PCI bus segment 715B coupling to the PMC connectors 704.

Continuing to refer to FIG. 7, an error reporting block 718 is utilized in the card circuitry 700 for reporting physical errors and preferably whenever the host processor is to be interrupted. Examples of the physical errors include dual-port RAM parity errors, internal queue overflow errors, IDI errors, and the like. A serial interface connection 713 is accordingly provided for interconnecting the error reporter block 718 with the appropriate entities of the card circuitry 700. On the other hand, error reporting generated by protocol layers and other SLPs utilize appropriate status reporting mechanisms provided by the GSM processing architecture.

In an exemplary implementation, each of the link data processor, link control processor and the data transfer controller blocks described hereinabove may be provided as a device selected from the group consisting of a field programmable gate array (FPGA), a programmable logic device (PLD), an application specific integrated circuit (ASIC), an embedded processor, and a general purpose processor. In another exemplary implementation, the link data processor, link control processor and the data transfer controller blocks may be integrated in any combination. For instance, the link data processor and link control processor blocks may be integrated into a single block.

Figure 8:
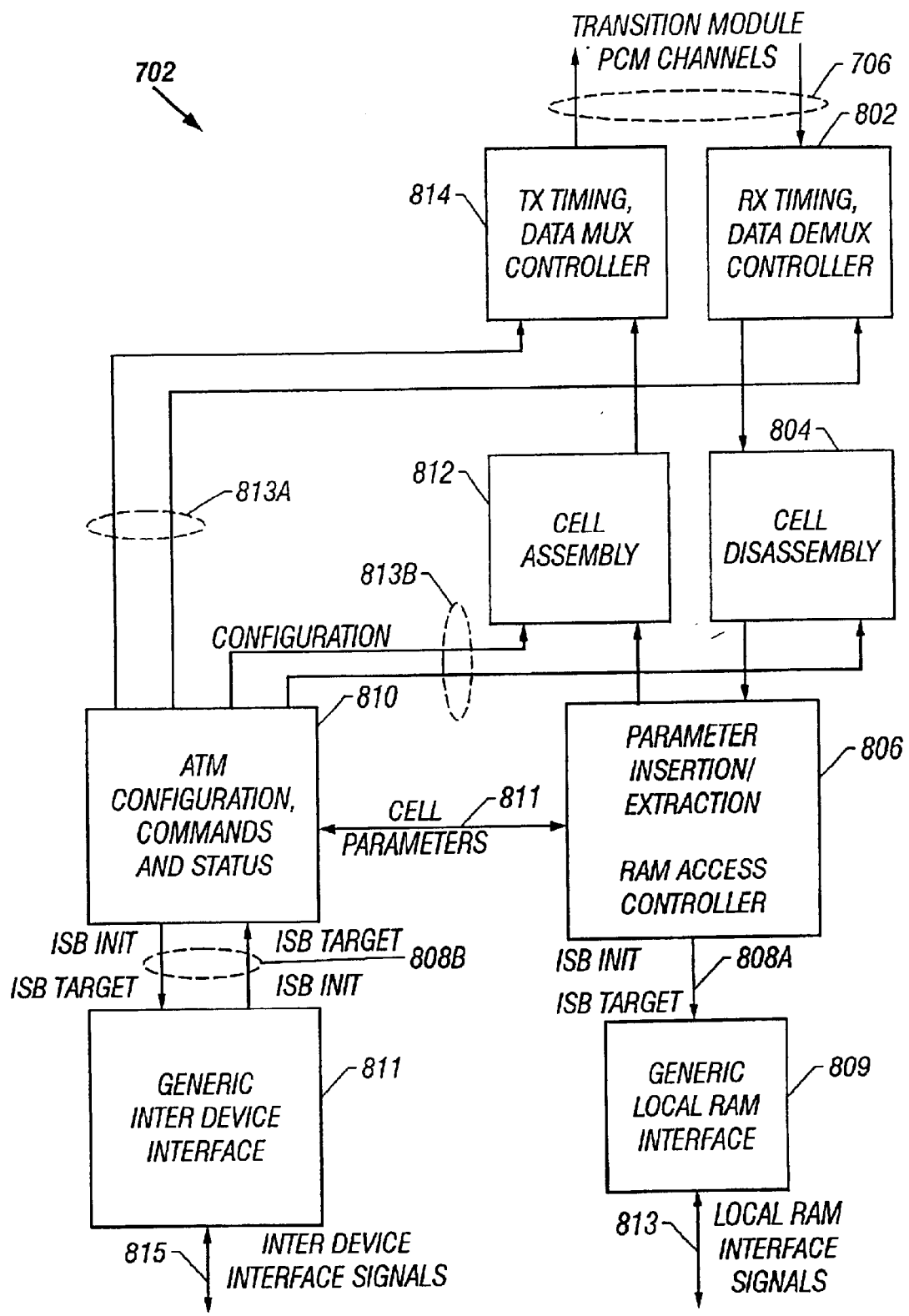
FIG. 8 depicts an exemplary functional block diagram of a link data processor of the HSL card circuitry.

FIG. 8 depicts an exemplary functional block diagram of the link data processor 702 described hereinabove. Conceptually, the link data controller 702 is organized into an ATM configuration, command and status (CCS) portion and a cell traffic (CT) portion Preferably, the CCS portion comprising ATM CCS block 810 provides appropriate configuration signals to one or more components of the CT portion. With respect to the CT portion, the PCM channels 706 coupled to a rear panel transition module (TM) that is associated with the HSL card circuitry are interfaced to a receive controller block 802 and a transmit controller block 814, each of which is coupled to the CCS block 810 via a configuration signal path 813A. The receive controller block 802 is operable to provide receive timing and data demuxing with respect to the data traffic received on the PCM channels 706. In similar fashion, the transmit controller block 814 is operable to provide transmit timing and data muxing with respect to the data traffic transmitted on the PCM channels 706. A cell disassembly block 804 provides the disassembled cell traffic to a parametric insertion/extraction block 806 which is coupled to a cell assembly block 812 on the transmit side of the CT portion. Both cell assembly block 812 and cell disassembly block 804 are also coupled to the ATM CCS block 810 via another configuration signal path 813B.

The parametric insertion/extraction block 806 is interfaced via path 811 with the ATM CCS block 810 for transmitting/receiving cell parameters with respect to the cell traffic in disassembled/assembled state. A RAM access controller is also provided with the parametric block 806, which controller is operable as an ISB initiator to effectuate bus transactions with a generic local RAM interface 809 (operable as an ISB target) via ISB segment 808A. The interface 809 is in turn operable to provide appropriate local RAM interface signals 813 to effectuate local memory storage operations.

Continuing to refer to FIG. 8, the ATM CCS block 810 is coupled to a generic IDI block 811 via another ISB segment 808B for communicating with the link control processor 710 (shown in FIG. 7, for example) The generic IDI block 811 is in turn operable to generate appropriate IDI signals 815 for effectuating the IDI between the link control processor and link data processor in order to exchange control information including buffer control information, etc., regarding the ATM layer data processing.

Figure 9:
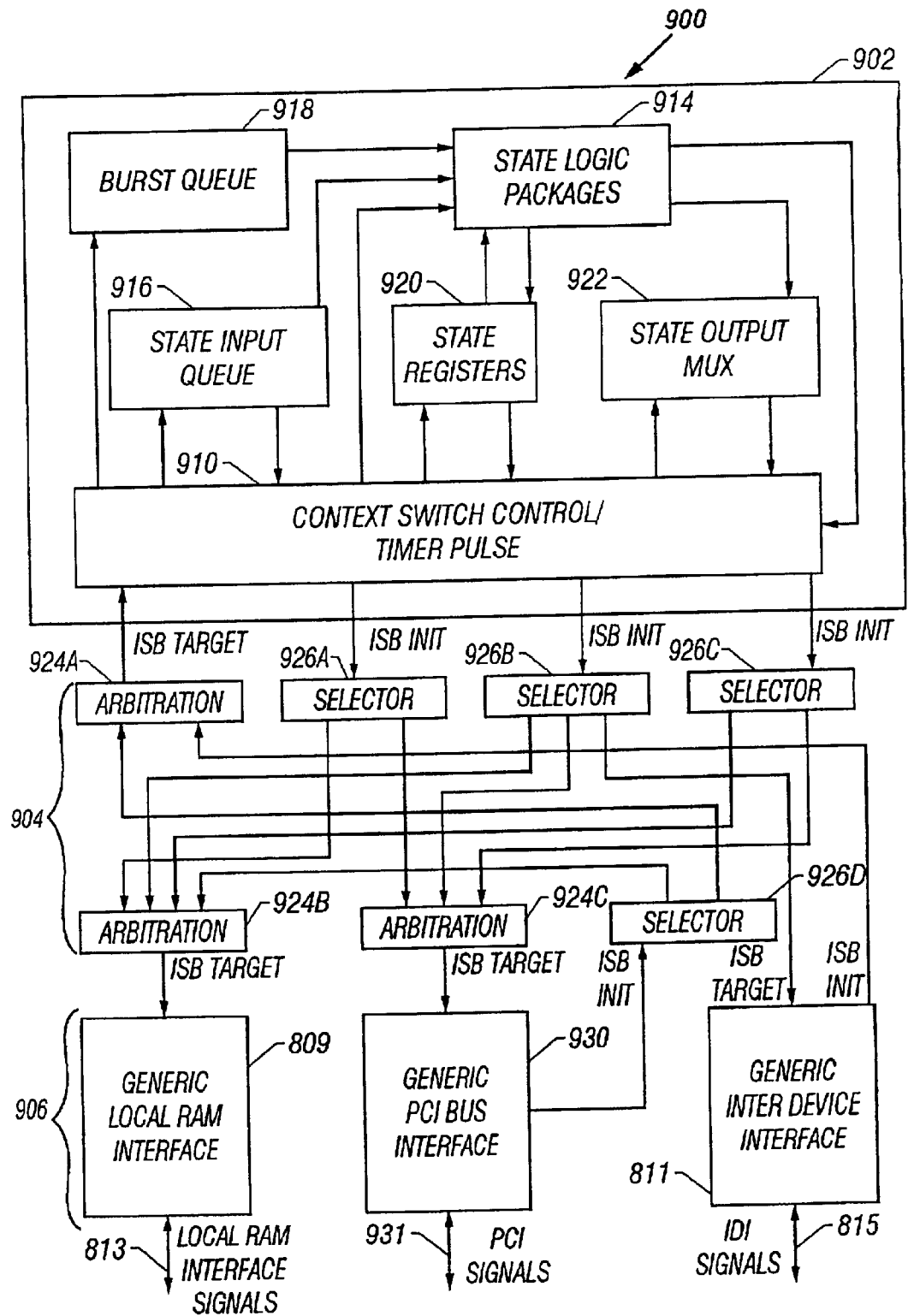
FIG. 9 depicts an exemplary functional block diagram of the GSM architecture circuitry preferably provided as part of the HSL card circuitry.

Referring now to FIG. 9, depicted therein is an exemplary functional block diagram of the GSM processing architecture circuitry 900 that is utilized for implementing the link control processor and data transfer controller functionality of the HSL card circuitry in accordance with the teachings of the present invention. The GSM processing architecture circuitry 900 includes a common state processing block 902 coupled to a GIO interface portion 906 via an ISB system 904. The common state processing block 902 is preferably provided with a context switch/control and timer pulse block 910 for personalizing one or more SLPs 914 using layer-specific context data (i.e., state-specific information) retrieved from a context memory (not explicitly shown). The context switch function controls access to state information based on CIDs and SAP information relating to the various HSL layers. Preferably, all information regarding location of context-specific state information is controlled and/or maintained within this functionality which is operable to be configured with a connection table base, connection SAP offsets (for the different HSL layers), and shared SAP base addresses. The context switch control also initiates bursts when the current input of SAP corresponds to a burst operation.

The timer pulse functionality generates the current time and compares it to the expiration time of the next scheduled time event. Preferably, a consistent timing signal is used to generate a local time reference. An output comprising the relevant SAP, CID, and expiration code is generated by the timer pulse function. The burst control functionality performs data moving operations according to the data input event burst parameters. Data may be inserted or removed during the burst process under control of the relevant state logic.

One or more state input queues 916 are provided for effectuating the inputting of state information (based on SAP/CID) and an event code corresponding to the layer interface signals to the SLP block 914. A plurality of state registers 920 are disposed between the context switch/control and timer pulse block 910 and the SLP block 914. Preferably, a separate burst queue 918 is provided for burst operations relating to a particular protocol layer functionality. A state output multiplex (MUX) block 922 is operable to control the outputting of next-state information to appropriate destinations based on the SAP/CID information provided in the output event vector generated by the personalized SLP block 914.

Events are transferred between the different state machines realized by the personalized SLPs 914 of the common state processing block 902 using the appropriate SAP/CID information. The context switch functionality uses the logical SAP output from the state logic to generate an ISB address for the physical destination associated therewith, which address is resolved by the ISB system 904 to "route" the event appropriately. The physical destination can then determine the logical destination based on the SAP/CID values contained in the event vector.

The ISB system 904 is comprised of a plurality of arbitration modules and selector modules interconnected through a bus such as the ISB briefly alluded to in particular reference to FIGS. 5 and 8 hereinabove. Arbitration modules 924A through 924C and selector modules 926A through 926D are exemplified herein, which operate to effectuate ISB transactions between the context switch/control block 910 and a plurality of generic device interfaces. As one skilled in the art should readily recognize, the ISB transactions are preferably provided as bus initiator/target operations that are negotiated by means of the arbitration and selector modules.

The GIO interface portion 906 is exemplified with one or more generic IDI blocks 811, one or more generic PCI blocks 930, and one or more generic RAM interface blocks 809. As set forth hereinabove with respect to FIG. 8, the generic RAM interface blocks 809 and generic IDI blocks 811 are operable to generate appropriate local RAM signals 813 and IDI signals 815, respectively. In similar fashion, the generic PCI blocks 930 are operable to generate appropriate PCI signals 931 to effectuate local PCI bus transactions.

Figure 10:
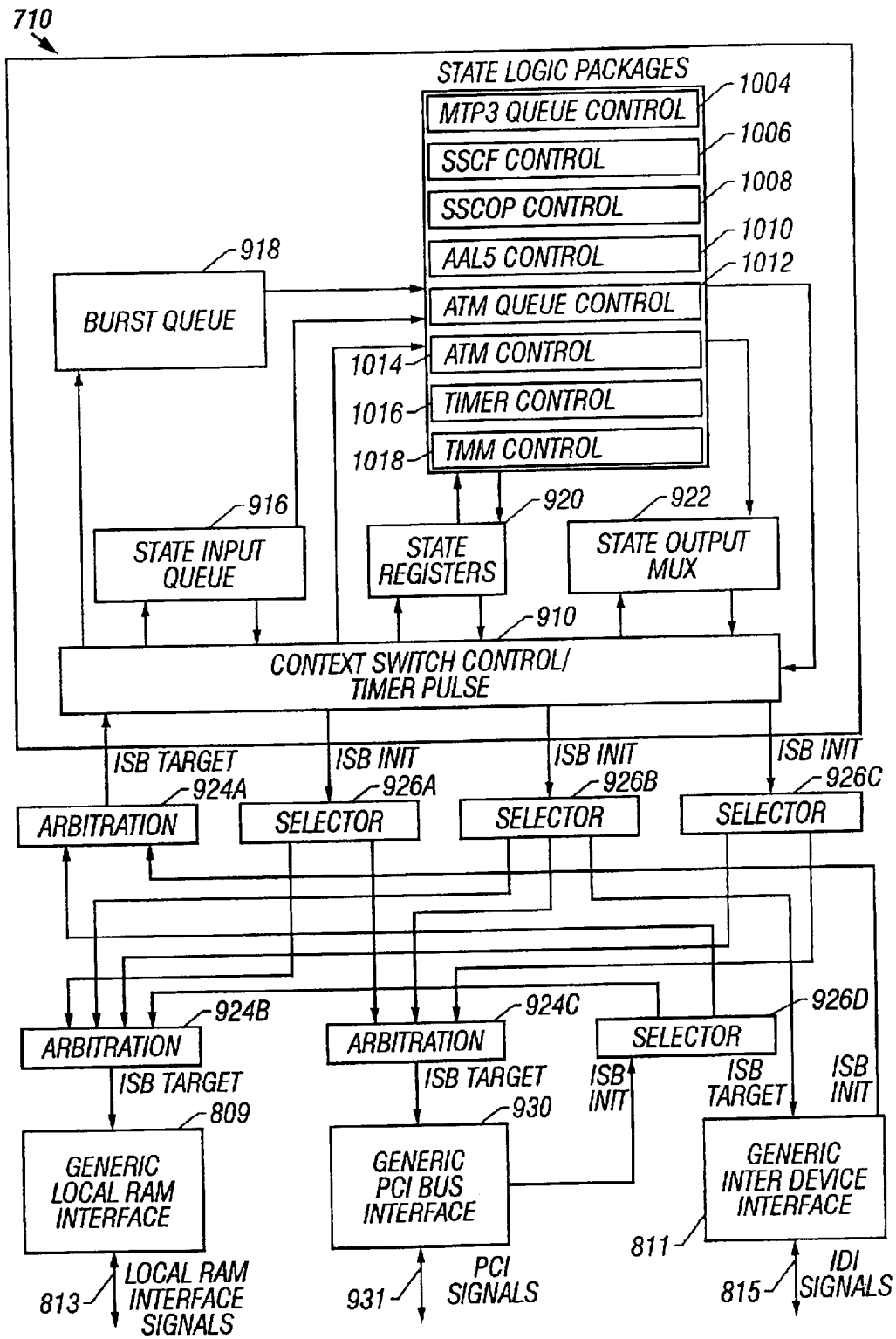
FIG. 10 depicts an exemplary functional block diagram of a link control processor of the HSL card circuitry which utilizes the GSM architecture in accordance with the teachings of the present invention.
Figure 11:
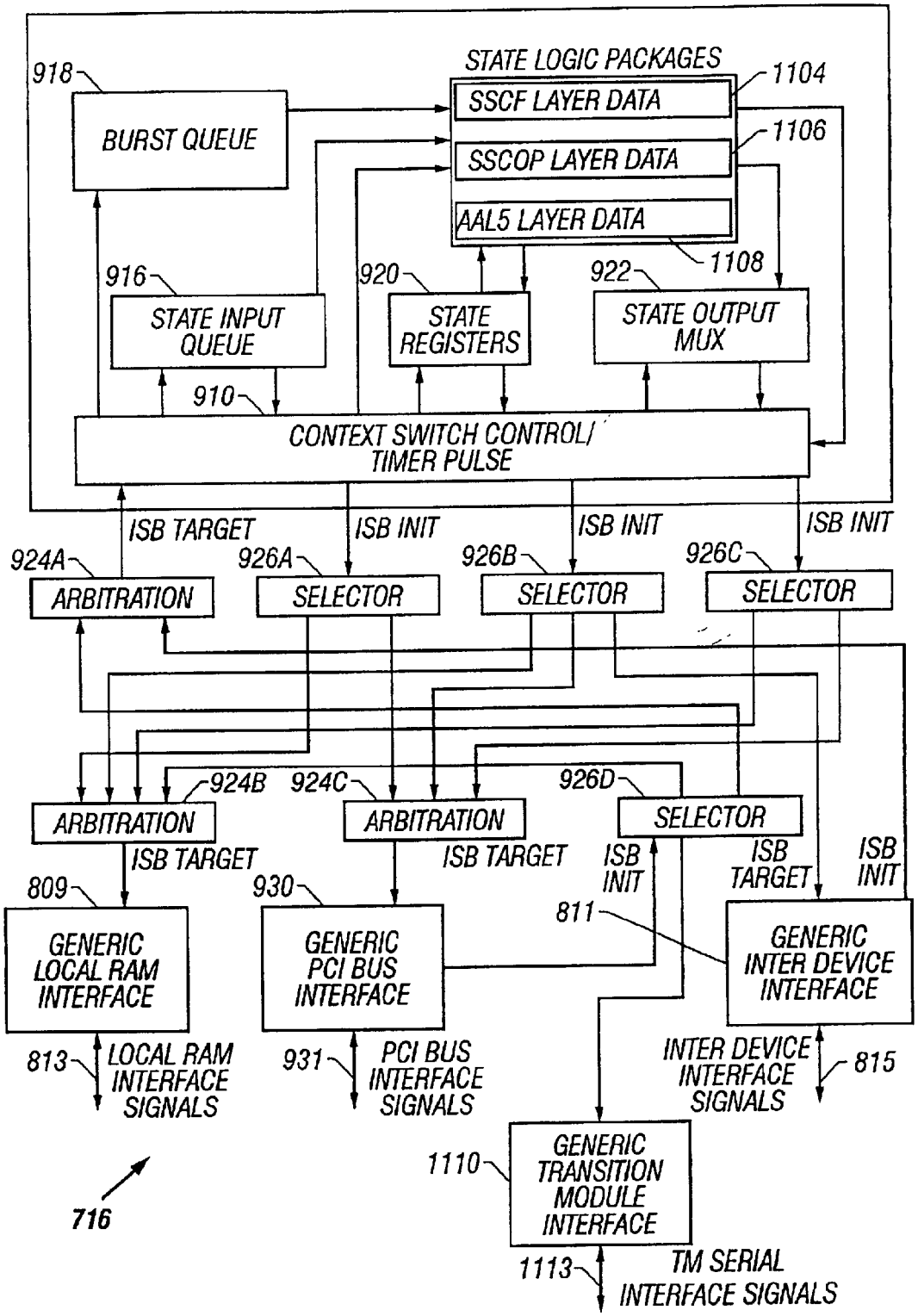
FIG. 11 depicts an exemplary functional block diagram of a data transfer controller of the HSL card circuitry which utilizes the GSM architecture in accordance with the teachings of the present invention.

FIGS. 10 and 11 depict exemplary functional block diagrams of the link control processor 710 and data transfer controller 716, respectively, of the HSL card circuitry which utilizes the GSM architecture in accordance with the teachings of the present invention. It should be apparent to one skilled in the art that these functional block diagrams of essentially similar to the functional block diagram of the GSM architecture circuitry 900 described hereinabove with particular reference to FIG. 9. Accordingly, only the salient features of the block diagrams of the link control processor 710 and data transfer controller 716 are set forth below.

In particular reference to the link control processor 710, which is operable to maintain link states for the control portion of the relevant HSL layers, the SLP block includes the following: MTP-3 Queue Control 1004, SSCF Control 1006, SSCOP Control 1008, AAL5 Control 1010, ATM Queue Control 1012, ATM Control 1014 (which includes ATM's Operations, Administration and Maintenance (OAM) functionality), Timer Control 1016 including its Data Processing Parts, and Traffic Metering and Measurement (TMM) Control 1018 and its Data Processing Parts. Although not explicitly shown in FIG. 10, appropriate Management Configuration and Status Interfaces are provided for all layers.

The data transfer controller 716 shown in FIG. 11, which is responsible for burst transfers of SUs between the application node's host processor RAM and local MRAM cell memory, includes the following state logic as part of its SLP block: SSCF Layer Data Processing 1104, SSCOP Layer Data Processing 1106, and AAL5 Layer Data Processing 1108. As pointed out hereinabove, layer overhead may be inserted or extracted from the data stream during the burst operation by the data transfer controller 716.

As alluded to hereinabove, in an exemplary implementation of the HSL card circuitry, the link data processor, link control processor and the data transfer controller, and/or the respective context switch/control blocks and GSM logic structures (where applicable) may be provided as a field programmable gate array (FPGA), a programmable logic device (PLD), an application specific integrated circuit (ASIC), an embedded processor, or a general purpose processor. Preferably, each device has an assigned range of addresses which the internal ISB system uses to route the initiator transactions to the target. The selector function of the ISB system is operable to decode the destination address and pass the arbitration signals to the relevant destination of the transaction. The arbiter function of the ISB system grants initiator accesses to a given target and is responsible for resolving conflicting requests through the use of the ISB Acknowledgment (ACK) signals. Event transactions are routable to the link control processor's context switch, data transfer controller's context switch, or link data processor's control function. Context switching and data burst transactions are routed to the MRAM and CRAM blocks, TM interfaces, or directed to the PCI bus.

Figure 12:
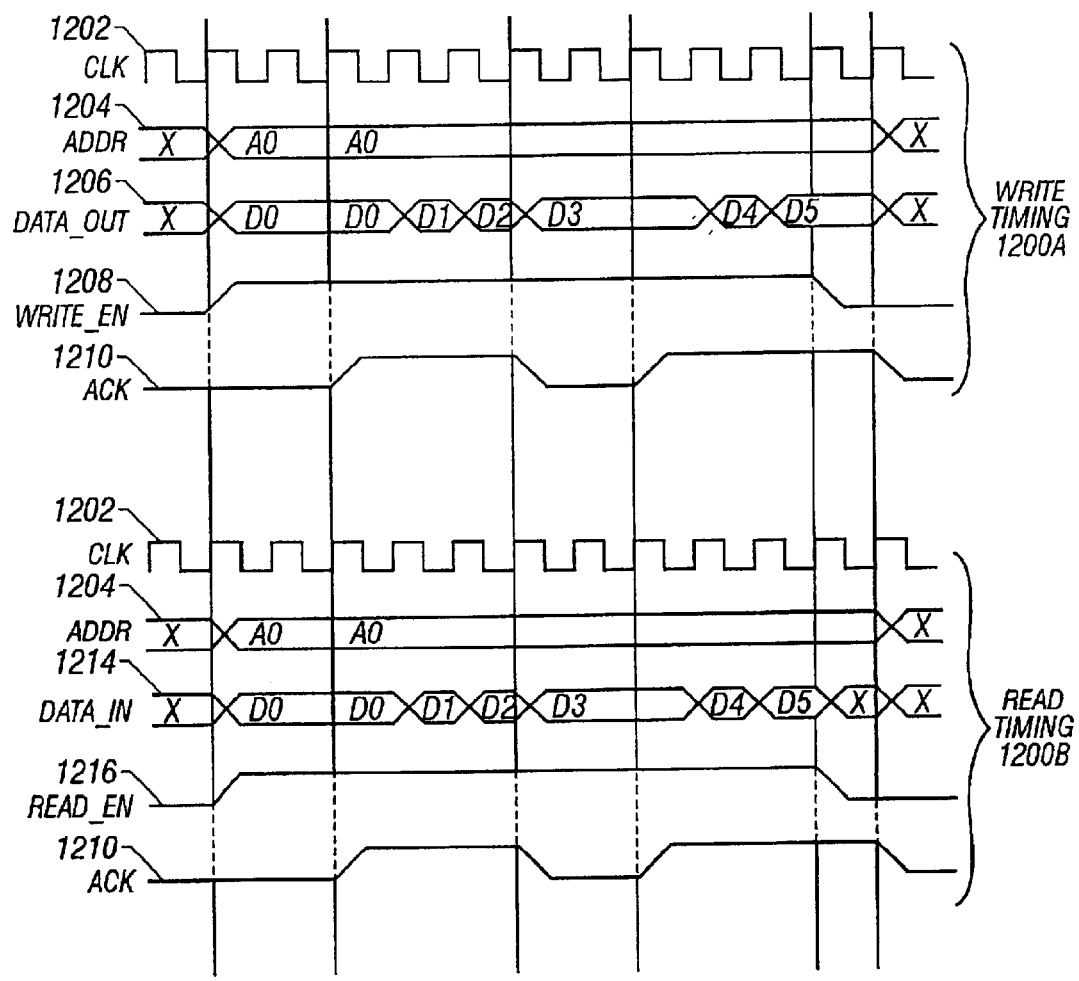
FIG. 12 is a timing diagram for effectuating read/write operations using a internal standard bus (ISB) provided for interconnecting the context switch and control system with generic input and output (GIO) interfaces.

Referring now to FIG. 12, depicted therein is an exemplary timing diagram for effectuating read/write operations using the ISB interface of the present invention. As alluded to hereinabove, the ISB interface is operable to provide a standard interconnection between the various entities of the HSL card circuitry, which preferably involves a simple address and data bus, along with control signals which allow for hold-off on multiple access bus segments and "queue full" scenarios. The ISB system is operable to support both simple point-to-point access scenarios as well as multiple accesses involving arbitration and multiplexing of the entities. In a presently preferred exemplary embodiment of the present invention, the following forward signals are provided: Address (32-bit), Data_Out (32-bit), Read_Request, Write_Request, and Address_Enable. The following reverse signals are used in association with the foregoing forward signals: Data_In (32-bit), Acknowledge, and Transfer_Error.

Reference numeral 1200A in FIG. 12 refers to the write timing sequence involving the ISB system. At the beginning of a write cycle indicated by a rising edge in CLK signal 1202, Address 1204, Data_Out 1206, and Write_Enable 1208 are asserted by the initiator. The target of the write operation asserts an Acknowledge 1210 when it is ready to accept data from the initiator. Preferably, the initiator of the write cycle is operable to change the write data on the rising edge of the CLK signal 1202 when the Acknowledge 1210 is asserted.

For the read timing sequence 1200B, Address 1204 and Read_Enable 1216 are asserted by the initiator at the beginning of a read cycle indicated by the CLK signal 1202. The target of the read operation asserts the Acknowledge 1210 and Data_In 1214 when the read data is available. Preferably, the target is provided to be responsible for keeping track of the address range, wherein the initiator only provides the starting address.

Figure 13:
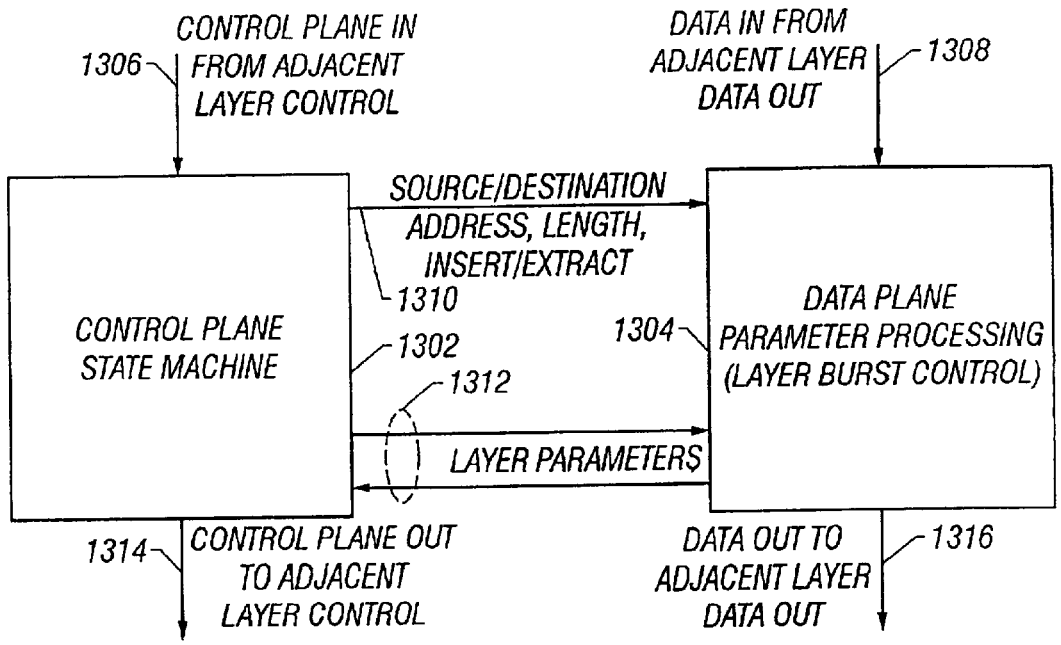
FIG. 13 depicts an exemplary functional schematic diagram wherein a personalized GSM logic structure is partitioned into a control plane and a data plane in accordance with the teachings of the present invention.

It should be appreciated that the context switch functionality and event vectorization not only allow for personalizing the GSM logic structure but the control and data operations can be performed separately in order to increase the protocol performance at an application node. Accordingly, the application node is advantageously capable of supporting a large number of high speed signaling links in spite of the increased protocol processing. FIG. 13 depicts an exemplary functional schematic diagram wherein a personalized GSL logic structure is partitioned into a control plane 1302 and a data plane 1304 in accordance with the teachings of the present invention for parallelizing the control and data operations to optimize the GSM performance with respect to the various state machine transitions (i.e., current state to next state). Preferably, the control plane 1302 is primarily driven by events, whereas the data plane logic 1304 is provided to be processing-oriented with respect to the data. In some exemplary embodiments, however, crossover in functionality may be required to facilitate implementation.

As pointed out earlier, state machine controls and internal SU transfers are event driven, wherein an event is preferably comprised of a SAP/CID vector and input code to be interpreted according to the SAP. Preferably, SAP/CID definition and vectorization is provided external to the state machine implementation so that the architecture remains as generic as possible. It is also preferred that specific input/output coding be defined external to the GSM architecture such that it can be independently referenced by each system component requiring access thereto. While the data and control planes may be accessed through a single SAP, the SAP can be modified according to specific data plane or control plane access points. For example, a particular bit of a SAP may indicate data plane access versus control plane access to facilitate routing.

The control plane state machine 1302 is operable to receive control input from an adjacent layer's control 1306 by means of the appropriate SAP/CID information provided by the adjacent layer's control state machine as its output vector. Those skilled in the art should realize upon reference hereto that the context switching function of the GSM architecture is well-suited to facilitate such inter-layer control flow. The data plane 1304 is responsible for parameter processing and layer burst control, and is operable to receive data input from the previous layer's data output 1308. The control and data planes are operable to interact with each other for layer parameter exchange operations 1312. Further, the control plane 1302 is also responsible for providing control information 1310 to the data plane 1304 such as source/destination addresses, message length, parameter insertion/extraction information, and the like.

The context switching function of the GSM architecture is operable to provide output 1314 from the control plane 1302 as control input to the control plane of the next layer (i.e., service user) of the HSL protocol stack. In similar fashion, data output 1316 from the data plane 1304 is provided to the next layer's data plane for its data operations.

Figure 14:
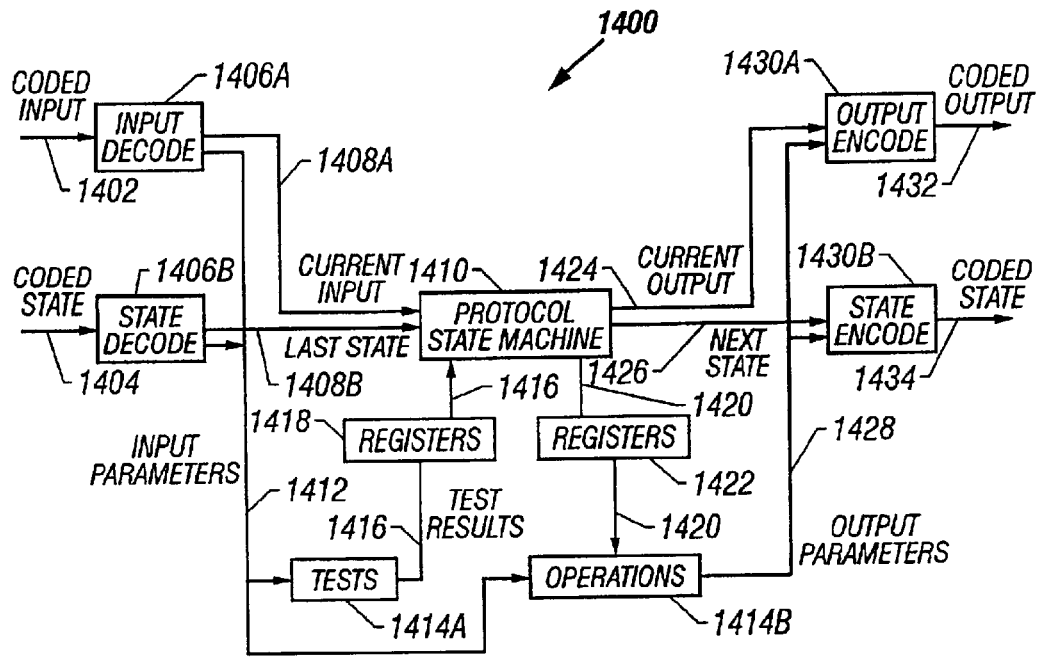
FIG. 14 depicts an exemplary functional block diagram of a partitionable state logic program for effectuating control and data transfer operations in a substantially parallel fashion.

Referring now to FIG. 14, depicted therein is an exemplary SLP 1400 partitionable into control and data planes for effectuating substantially parallel control and data operations for a particular protocol layer relative to a layer service in the HSL stack. Essentially, the entire SLP logic is segregated into well-defined, individual logic blocks with a fixed number of logic levels. The logic blocks are then preferably interspersed with registers in a suitable device implementation to accommodate routing or gate delay characteristics of the SLP device.

A coded input event 1402 and a coded state-specific information structure 1404 are decoded via a decoder block comprising an input decoder 1406A and a state decoder 1406B. Decoded previous state (or, latest state) information 1408B is provided to the protocol state machine 1410 for personalizing its functionality such that it corresponds to a particular layer's functionality. At least a portion of the decoded current input 1408A is provided to the protocol state machine 1410 for control plane processing. In a substantially parallel manner, input parametric information 1412 is extracted from at least a portion of the decoded input and the decoded state-specific information and is provided to a tester block 1414A for performing relevant tests (e.g., mathematical/comparison tests for specific values such as sequence numbers, etc.) on the input parametric information. The tester block output 1416 (i.e., test results) is preferably provided to the control plane's state machine 1410 via a plurality of delay registers 1418 operable to control and/or synchronize routing delays associated with the control and data planes.

At least a portion of the input parametric information 1412 is also provided in a substantially parallel fashion to an operations module 1414B for performing protocol-specific operations thereon. For example, such operations comprise cyclical redundancy check (CRC) operations, protocol overhead operations, et cetera. The control plane is operable to provide appropriate control information to the operations module 1414B to facilitate the protocol-specific operations performed thereat. Preferably, a set of delay registers 1422 are provided between the control plane's state machine 1410 and the operations module 1414B in a feed-forward loop in order to facilitate control of the inter-plane gate/clock/routing delays.

Output parametric information 1428 provided by the operations module 1414B is respectively combined with the control plane's current output 1424 and next-state information 1426 by an output encoder 1430A and a state encoder 1430B to generate a coded output event 1432 and a coded next-state information structure 1434. As set forth in greater detail hereinabove, the output event 1432 includes an output event vector with SAP/CID information for identifying appropriate destination or destinations with respect to the next-state information.

Figure 15:
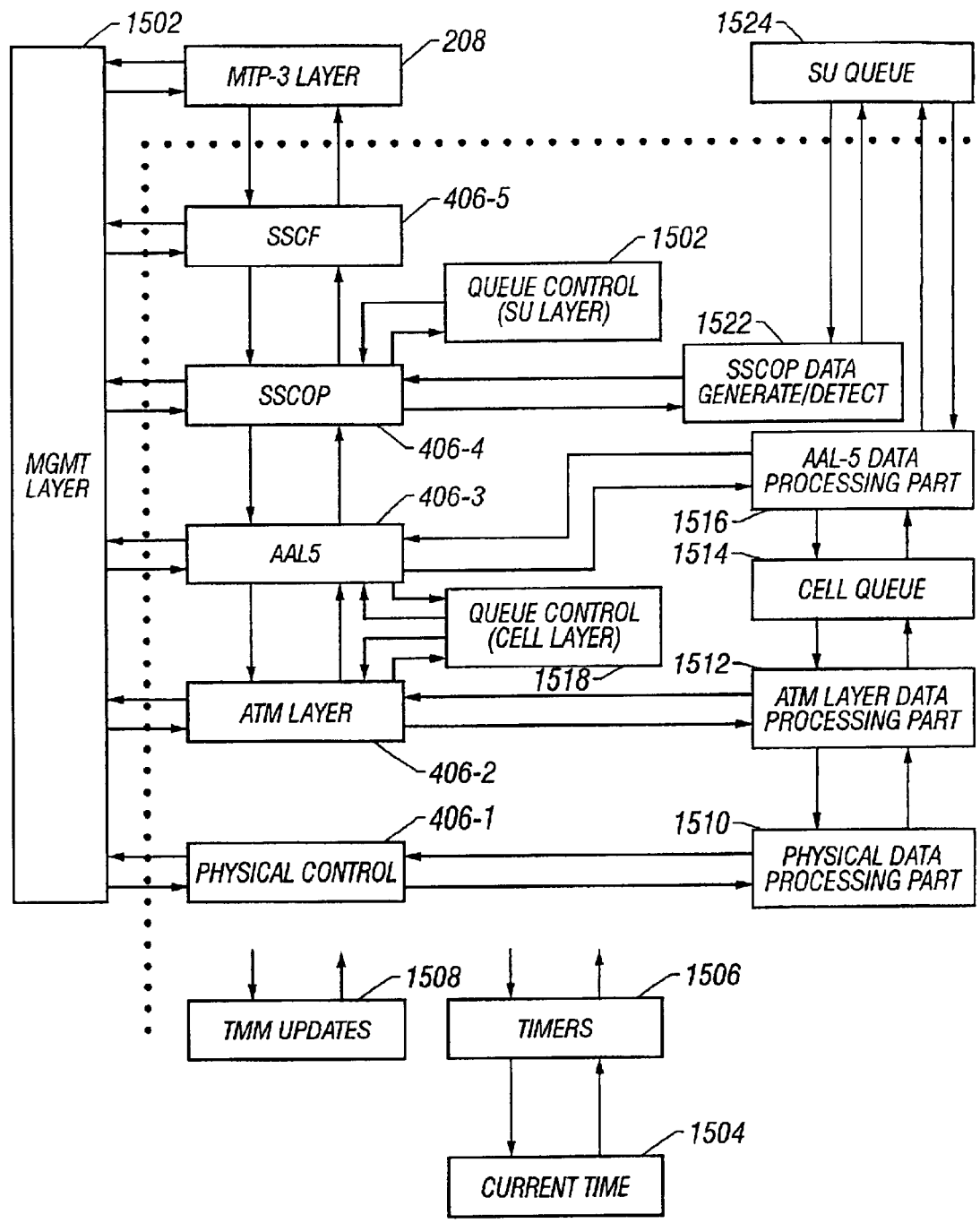
FIG. 15 depicts a functional flow diagram of an exemplary HSL protocol stack implementation in accordance with the teachings of the present invention.

FIG. 15 depicts a functional flow diagram of an exemplary HSL protocol stack implementation using the SS7-over-ATM signaling protocol stack described hereinabove in reference to FIG. 4. A Management Layer 1502 interacts with each of the layers in the protocol suite: PHY 406-1, ATM Layer 406-2, AAL5 406-3, SSCOP Layer 406-4, SSCF Layer 406-5, and MTP-3 Layer 208. A current time block 1504 supports a Timer block 1506 which provides timing with respect to the protocol stack's functional flow. Appropriate TMM updates 1508 are also provided to the protocol stack.

A PHY Data Processing Part 1510 associated with the PHY layer 406-1 is operable in association with an ATM Layer Data Processing Part 1512 to effectuate conversion between protocol message traffic and ATM cell traffic. A cell queue 1514 buffers the cell traffic before being processed by an AAL5-Data Processing Part 1516 associated with the AAL5 Layer 406-3. A cell layer queue control 1518 is accordingly associated with the ATM and AAL5 Layers.

The AAL5-Data Processing Part 1516 is responsible for conversion between the ATM cell traffic and the SU flow utilized by the higher layers. Appropriate SU queues 1524 are provided for buffering the SU flow. The SSCOP Layer 406-4 manages the SU flow under SU layer queue control 1520 and SSCOP Data Generate/Detect block 1522 to provide Service Data Units (SDUs) to the SSCF Layer 406-5 which, in turn, provides an interface to the MTP-3 Layer 208 of the protocol stack. Although not explicitly provided in the functional flow diagram depicted in this FIG., one should recognize that one or more appropriate SS7 applications may be included in the protocol's functional flow.

Based upon the foregoing Detailed Description, it should be readily apparent that the present invention provides an innovative GSM architecture that is personalizable and partitionable using a context switching function to efficiently process the huge protocol overheads typically associated with the conventional implementations of high speed signaling links. By personalizing a common state machine processing function, the need for managing a large number of individual state machines necessary to support the combination of M protocol layers by N links at a network element is advantageously obviated. Further, by partitioning the state machine logic into control and data planes, state transitions are optimized due to the substantially parallel processing capability resulting therefrom.

Moreover, the presently preferred exemplary embodiment of the present invention provides a flexible implementation which allows re-targeting of specific components to alternative system environments. Because input/output event decoding and encoding is external to the state machine logic implementation, common interfaces to the GSM architecture can be easily designed.

Further, it is believed that the operation and construction of the present invention will be apparent from the foregoing Detailed Description. While the system and method shown and described have been characterized as being preferred, it should be readily understood that various changes and modifications could be made therein without departing from the scope of the present invention as set forth in the following claims. For example, while the teachings of the present invention have been particularly exemplified with the use of SS7over-ATM signaling links, those skilled in the art should recognize that the present invention can be practiced in conjunction with signaling links having other protocol implementations such as, e.g., SS7-over-IP and the like. Also, whereas the various functional blocks of the present invention are preferably implemented in suitable hardware in order to optimize performance, such implementations are neither limiting nor restrictive. Thus, it should be appreciated that any combination of hardware, software, firmware, etc. may be utilized for implementing the teachings of the present invention. Accordingly, all such modifications, extensions, variations, amendments, additions, deletions, combinations, and the like are deemed to be within the ambit of the present invention whose scope is defined solely by the claims set forth hereinbelow.

What is claimed is:

1. A system for effectuating at least one protocol layer of a protocol stack operable to implement a high speed communication link at a network node, comprising:

an input event structure including at least a service access point (SAP) and a connection identifier (CID) associated with a protocol layer service involving a select service user layer and service provider layer combination for a particular connection link;

a context switch and controller block operable to retrieve latest state-specific context information from a context storage area based on said SAP and CID; and a generic state logic program structure operable to process at least a portion of said input event structure based on said latest state-specific context information to generate next-state context information and at least an output event vector including at least one SAP and at least one CID associated with a select destination point to which said next-state context information is to be routed, wherein said next-state context information is operable to be stored in said context storage area based on a storage SAP and CID provided in said input event structure.

2. The system for effectuating at least one protocol layer of a protocol stack operable to implement a high speed communication link at a network node as set forth in claim 1, further comprising a state input queue structure and a state output queue structure operably disposed between said generic state logic program structure and said context switch and controller block for facilitating information flow therebetween.

3. The system for effectuating at least one protocol layer of a protocol stack operable to implement a high speed communication link at a network node as set forth in claim 2, further comprising a plurality of state registers operably disposed between said generic state logic program structure and said context switch and controller block.

4. The system for effectuating at least one protocol layer of a protocol stack operable to implement a high speed communication link at a network node as set forth in claim 3, wherein at least one of said generic state logic program structure and said context switch and controller block is implemented as a field programmable gate array.

5. The system for effectuating at least one protocol layer of a protocol stack operable to implement a high speed communication link at a network node as set forth in claim 3, wherein at least one of said generic state logic program structure and said context switch and controller block is implemented as a programmable logic device.

6. The system for effectuating at least one protocol layer of a protocol stack operable to implement a high speed communication link at a network node as set forth in claim 3, wherein at least one of said generic state logic program structure and said context switch and controller block is implemented as an application specific integrated circuit.

7. The system for effectuating at least one protocol layer of a protocol stack operable to implement a high speed communication link at a network node as set forth in claim 3, wherein at least one of said generic state logic program structure and said context switch and controller block is implemented as a device selected from the group consisting of a field programmable gate array, a programmable logic device, an application specific integrated circuit, an embedded processor and a general purpose processor.

8. The system for effectuating at least one protocol layer of a protocol stack operable to implement a high speed communication link at a network node as set forth in claim 7, wherein said generic state logic program structure is personalizable as a Message Transfer Part-Level 3 (MTP-3) queue control state machine based on said state-specific context information in said context storage area.

9. The system for effectuating at least one protocol layer of a protocol stack operable to implement a high speed communication link at a network node as set forth in claim 7, wherein said generic state logic program structure is personalizable as a Service Specific Coordination Function (SSCF) control state machine based on said state-specific context information in said context storage area.

10. The system for effectuating at least one protocol layer of a protocol stack operable to implement a high speed communication link at a network node as set forth in claim 7, wherein said generic state logic program structure is personalizable as an Asynchronous Transfer Mode (ATM) Adaptation Layer (AAL) control state machine based on said state-specific context information in said context storage area.

11. The system for effectuating at least one protocol layer of a protocol stack operable to implement a high speed communication link at a network node as set forth in claim 7, wherein said generic state logic program structure is personalizable as an ATM queue control state machine based on said state-specific context information in said context storage area.

12. The system for effectuating at least one protocol layer of a protocol stack operable to implement a high speed communication link at a network node as set forth in claim 7, wherein said generic state logic program structure is personalizable as an ATM control state machine based on said state-specific context information in said context storage area.

13. The system for effectuating at least one protocol layer of a protocol stack operable to implement a high speed communication link at a network node as set forth in claim 7, wherein said generic state logic program structure is personalizable as a Service Specific Connection Oriented Protocol (SSCOP) control state machine based on said state-specific context information in said context storage area.

14. The system for effectuating at least one protocol layer of a protocol stack operable to implement a high speed communication link at a network node as set forth in claim 7, wherein said generic state logic program structure is personalizable as a Traffic Metering and Measurement (TMM) control state machine based on said state-specific context information in said context storage area.

15. The system for effectuating at least one protocol layer of a protocol stack operable to implement a high speed communication link at a network node as set forth in claim 7, wherein said generic state logic program structure is personalizable as a Timer control state machine based on said state-specific context information in said context storage area.

16. The system for effectuating at least one protocol layer of a protocol stack operable to implement a high speed communication link at a network node as set forth in claim 7, wherein said generic state logic program structure is personalizable as a state machine operating to transfer SSCOP layer data based on said state-specific context information in said context storage area.

17. The system for effectuating at least one protocol layer of a protocol stack operable to implement a high speed communication link at a network node as set forth in claim 7, wherein said generic state logic program structure is personalizable as a state machine operating to transfer SSCF layer data based on said state-specific context information in said context storage area.

18. The system for effectuating at least one protocol layer of a protocol stack operable to implement a high speed communication link at a network node as set forth in claim 7, wherein said generic state logic program structure is personalizable as a state machine operating to transfer AAL layer data based on said state-specific context information in said context storage area.

19. A system for implementing a high speed link (HSL) protocol stack having a plurality of protocol layers at an application node disposed in a network, comprising:
a link data processor for coordinating cell assembly and disassembly operations with respect to traffic flowing into and out of said application node;
a link control processor coupled to said link data processor via an inter-device interface, said link control processor operating to maintain link states for control portions of at least one of said protocol layers by utilizing a personalizable generic state processing architecture;
a data transfer controller coupled said link control processor via another inter-device interface for controlling burst transfers of signal units (SUs) between a host memory provided for said application node and a local cell memory associated with said link data processor; and
a context memory block disposed between said link control processor and said data transfer controller for storing state-specific context information based on a service access point (SAP) and a connection identifier (CID) associated with at least one of said protocol stack layers across at least one active connection maintained by said application node in said network, said context information for personalizing said generic state processing architecture to effectuate functionality of a select protocol stack layer.

20. The system for implementing an HSL protocol stack having a plurality of protocol layers at an application node disposed in a network as set forth in claim 19, further comprising an error reporting block having a serial interface at least for reporting physical errors including at least one of a memory parity error, queue overflow error and an inter-device interface error.

21. The system for implementing an HSL protocol stack having a plurality of protocol layers at an application node disposed in a network as set forth in claim 19, wherein at least one of said link data processor, said link control processor and said data transfer controller is implemented as a device selected from the group consisting of a field programmable gate array, a programmable logic device, an application specific integrated circuit, an embedded processor and a general purpose processor.

22. The system for implementing an HSL protocol stack having a plurality of protocol layers at an application node disposed in a network as set forth in claim 21, wherein said select protocol stack layer comprises a Message Transfer Part-Level 3 (MTP-3) layer.

23. The system for implementing an HSL protocol stack having a plurality of protocol layers at an application node disposed in a network as set forth in claim 21, wherein said select protocol stack layer comprises a Service Specific Coordination Function (SSCF) layer.

24. The system for implementing an HSL protocol stack having a plurality of protocol layers at an application node disposed in a network as set forth in claim 21, wherein said select protocol stack layer comprises a Service Specific Connection Oriented Protocol (SSCOP) layer.

25. The system for implementing an HSL protocol stack having a plurality of protocol layers at an application node disposed in a network as set forth in claim 21, wherein said select protocol stack layer comprises an Asynchronous Transfer Mode (ATM) Adaptation Layer (AAL).

26. The system for implementing an HSL protocol stack having a plurality of protocol layers at an application node disposed in a network as set forth in claim 19, wherein said link data processor and said link control processor are integrated into a single block.

27. A method for effectuating a layer service in a protocol stack operable to implement a high speed communication link at a network node, comprising the steps of:
    receiving, at a context switching system, an input event for said layer service from a service user layer;
    retrieving, by said context switching system, state-specific context information from a context memory based on a service access point (SAP) and a connection identifier (CID) relating to said input event;
    processing at least a portion of said input event by a generic state machine (GSM) logic structure personalized by said state-specific context information;
    generating, by said personalized GSM logic structure, next-state information and at least an output event vector including SAP/CID information for identifying at least one service user destination; and
    storing said next-state information in said context memory based on said SAP/CID information provided in said input event.

28. The method for effectuating a layer service in a protocol stack operable to implement a high speed communication link at a network node as set forth in claim 27, wherein at least one of said GSM logic structure and said context switching system is implemented as a device selected from the group consisting of a field programmable gate array, a programmable logic device, an application specific integrated circuit, an embedded processor and a general purpose processor.

29. The method for effectuating a layer service in a protocol stack operable to implement a high speed communication link at a network node as set forth in claim 28, wherein said GSM logic structure is personalized as a Message Transfer Part-Level 3 (MTP-3) queue control state machine based on said state-specific context information retrieved from said context memory.

30. The method for effectuating a layer service in a protocol stack operable to implement a high speed communication link at a network node as set forth in claim 28, wherein said GSM logic structure is personalized as a Service Specific Coordination Function (SSCF) control state machine based on said state-specific context information retrieved from said context memory.

31. The method for effectuating a layer service in a protocol stack operable to implement a high speed communication link at a network node as set forth in claim 28, wherein said GSM logic structure is personalized as a Service Specific Connection Oriented Protocol (SSCOP) control state machine based on said state-specific context information retrieved from said context memory.

32. The method for effectuating a layer service in a protocol stack operable to implement a high speed communication link at a network node as set forth in claim 28, wherein said GSM logic structure is personalized as an Asynchronous Transfer Mode (ATM) Adaptation Layer (AAL) control state machine based on said state-specific context information retrieved from said context memory.

33. The method for effectuating a layer service in a protocol stack operable to implement a high speed communication link at a network node as set forth in claim 28, wherein said GSM logic structure is personalized as an ATM control state machine based on said state-specific context information retrieved from said context memory.

* * * * *